United States Patent [19]

von Allwörden

[11] Patent Number: 4,955,188
[45] Date of Patent: Sep. 11, 1990

[54] ROUND BALER

[75] Inventor: Wilhelm von Allwörden, Gailingen, Fed. Rep. of Germany

[73] Assignee: Greenland GmbH & Co. KG, Fed. Rep. of Germany

[21] Appl. No.: 349,659

[22] Filed: May 10, 1989

[30] Foreign Application Priority Data

May 11, 1988 [DE] Fed. Rep. of Germany ....... 3816204

[51] Int. Cl.⁵ .................. A01D 39/00; B30B 15/08
[52] U.S. Cl. ........................... 56/341; 56/343; 100/6; 100/97
[58] Field of Search ............... 56/16.6, 131, 341, 343, 56/432; 100/6, 70 A, 97

[56] References Cited

U.S. PATENT DOCUMENTS

| 2,097,353 | 10/1937 | Tallman et al. | 100/97 |
| 2,355,646 | 8/1944 | Haase | 100/97 |
| 4,170,934 | 10/1979 | Oosterling et al. | 100/97 |

FOREIGN PATENT DOCUMENTS

| 0077474 | 9/1982 | European Pat. Off. |  |
| 0095621 | 12/1983 | European Pat. Off. | 56/341 |
| 2740339 | 3/1979 | Fed. Rep. of Germany | 56/341 |
| 3442831 | 8/1985 | Fed. Rep. of Germany |  |
| 3445050 | 6/1986 | Fed. Rep. of Germany |  |
| 8501745 | 1/1987 | Netherlands | 56/341 |
| 0938817 | 7/1982 | U.S.S.R. | 56/341 |

Primary Examiner—Bruce M. Kisliuk
Attorney, Agent, or Firm—Nilles & Nilles

[57] ABSTRACT

The round baler for cut stalk crops with a hinge-type pressing chamber comprises an inlet opening for the stalk crops and a tying arrangement for the completed bale, as well as a pick-up device for the stalk crops with a feed drum which is disposed between the pick-up device and the inlet opening and whose length corresponds to the width of the bale to be tied, as well as a cutting device which is provided in the feed channel and includes a plurality of pivotally supported knives which in their cutting position project into the feed channel and are arranged in at least one row, and which are held in their cutting position by means of spring-loaded knife levers and adapted to be pivoted singly or as a whole against the spring load up to a position in which they have no cutting effect on the stalk crops.

12 Claims, 4 Drawing Sheets

ROUND BALER

BACKGROUND OF THE INVENTION

1. Field of the Invention

The present invention relates to a round baler for cut stalk crops comprising a hinge-type pressing chamber including an inlet opening for the stalk crops and a tying arrangement for the completed bale, a pick-up device for the stalk crops, a feed drum which is disposed between the pick-up device and the inlet opening and whose length corresponds to the width of the bale to be tied, and a cutting device provided in the feed channel.

2. Description of the Related Art

Round balers are increasingly found because of their high performance of several hectares per hour, whereby even short fair-weather times can be made use of. Most of such balers are round balers wherein the stalk crops supplied by a pick-up device via a feed drum through the feed channel to the pressing chamber are formed by press rollers, which are disposed on the circumference of the pressing chamber, into a round bale which is thickly matted and whose individual stalks are interwoven. After a bale has been formed, it is bound by a suitable tying device, either with individual twines extending substantially parallel to each other or with a netting, and subsequently ejected by unhinging the rear half of the pressing chamber.

During the formation of the round bale the individual stalks are matted together to such an extent that difficulties may rise when the round bale is opened up later after the baler twines or the netting have been removed. Although suitable opening devices have already been developed, they cannot be used everywhere.

To facilitate the opening up of a round bale which has been wound by machine, it was already suggested in German patent application No. 27 40 339 that the inlet opening should have arranged in front thereof a cutting means for cutting up the harvest products to be pressed, said means comprising, for instance, cutting knives that are associated with the conveyor (pick-up device) in the feed channel.

Furthermore, German patent application No. 34 45 050 discloses a composite cutting device for round balers wherein the cutting device is composed of knives that have the form of a quarter disc or a half disc with interposed spacers so that a changeable action of the knives is effected and the harvest products are pressed by the carriers of the conveyor through every second knife. The length of the harvest products is here reduced to two knife distances.

These round balers that are provided with cutting devices do however not operate satisfactorily. On the one hand incoming foreign matter, such as stones, may damage the cutting device; on the other hand a fast and uncomplicated adjustment of the cutting lengths of the stalk crops is required during change of the harvest products.

SUMMARY OF THE INVENTION

It is the object of the present invention to provide a round baler comprising such a cutting device in the case of which the above-mentioned disadvantages are avoided, which permits a simple and effective adjustment of a specific number of predetermined cutting widths, which cannot be damaged by penetrating foreign matter and with the aid of which bales of both cut and uncut stalk crops can be formed.

On the basis of a round baler of the type shown in greater detail at the outset, the present invention suggests for the achievement of this object that the cutting device should include a plurality of pivotally supported knives which in their cutting position project into the feed channel and are arranged in at least one row, and which are held in their cutting position by means of spring-loaded knife levers and adapted to be pivoted against the spring load up to a position in which they have no cutting effect on the stalk crops.

The knife levers of at least one knife row are rotatably supported at about their center on a fixed pin, said knife row having associated therewith a triggering shaft which is provided with a number of curved cam members directly associated with the knife levers, said number corresponding to the number of the knives and the curved cam members being offset relative to each other with respect to the circumference of the triggering shaft.

According to the invention round bales can thereby be wound whose interior consists of cut stalk crops and can be easily opened up later, and whose surface layer consists of uncut stalk crops. At least the last wound surface layer may here be uncut by the cutting device being pivoted out of the feed channel as a whole. For this purpose a sensor is provided for sensing the internal pressure and/or the bale diameter and for controlling a corresponding pivoting device for the cutting device.

Each of the curved cam members comprises a lifting cam section, a centric part and a lowering cam section.

The trigger shaft is advantageously connected to a rotating means which may comprise a triggering shaft, a spur gear or a worm gear or, however, a threaded drawbar or push bar with a manually actuable ratchet.

In another advantageous embodiment the rotating means may comprise a threaded drawbar or push bar with a pressure cylinder or, however, a step drive with a ratchet mechanism and a ratchet wheel which can be connected via a drawbar to the pick-up device which is adapted to be pivoted through hydraulic cylinders and intended for the stalk crops.

The ratchet wheel has preferably associated therewith a rotatable adjusting segment which by the force of a spring is adjacent to the ratchet wheel and adapted to be locked therein, the adjusting segment comprising a portion which has at least the width of a tooth gap of the ratchet wheel, and projecting in the area of said portion over the outer edge of the ratchet wheel and engaging into the effective area of an advance pawl.

It is especially advantageous when the knife row consists of a plurality of knife groups and when the curved cam members of each knife group are offset relative to each other in such a way that the next knife group is only swung out into an inoperative position after the preceding group has been swung out.

It is also possible to provide the triggering shaft with a braking device to thereby prevent the sudden forward movement of all of the swung out knives into the cutting position when the triggering shaft is further operated, i.e. to slow down the sudden forward movement of the swung out knives.

Hence, the present invention achieves the advantage that the high performance of round balers can be fully used and that the cutting device can either be adjusted to different cutting lengths with effortless ease or entirely pivoted out of the feed channel before the round bale is completely wound. Especially when a ratchet mechanism with a ratchet wheel is used as a rotating means for the triggering shaft in conjunction with the existing hydraulic pivoting of the pick-up device, the cutting length can be adjusted by lifting and lowering the pick-up device one or several times, whereby the drawbar in conjunction with an advance pawl of the ratchet mechanism carries out intermittent movements. When the individual curved cam members are suitably offset, every second knife is swung out during each lift so that the cutting length is doubled at each step.

BRIEF DESCRIPTION OF THE DRAWINGS

The present invention will now be explained in greater detail with the help of the drawing in which an advantageous embodiment is illustrated and in which.

DESCRIPTION OF THE PREFERRED EMBODIMENT

Figure 1:
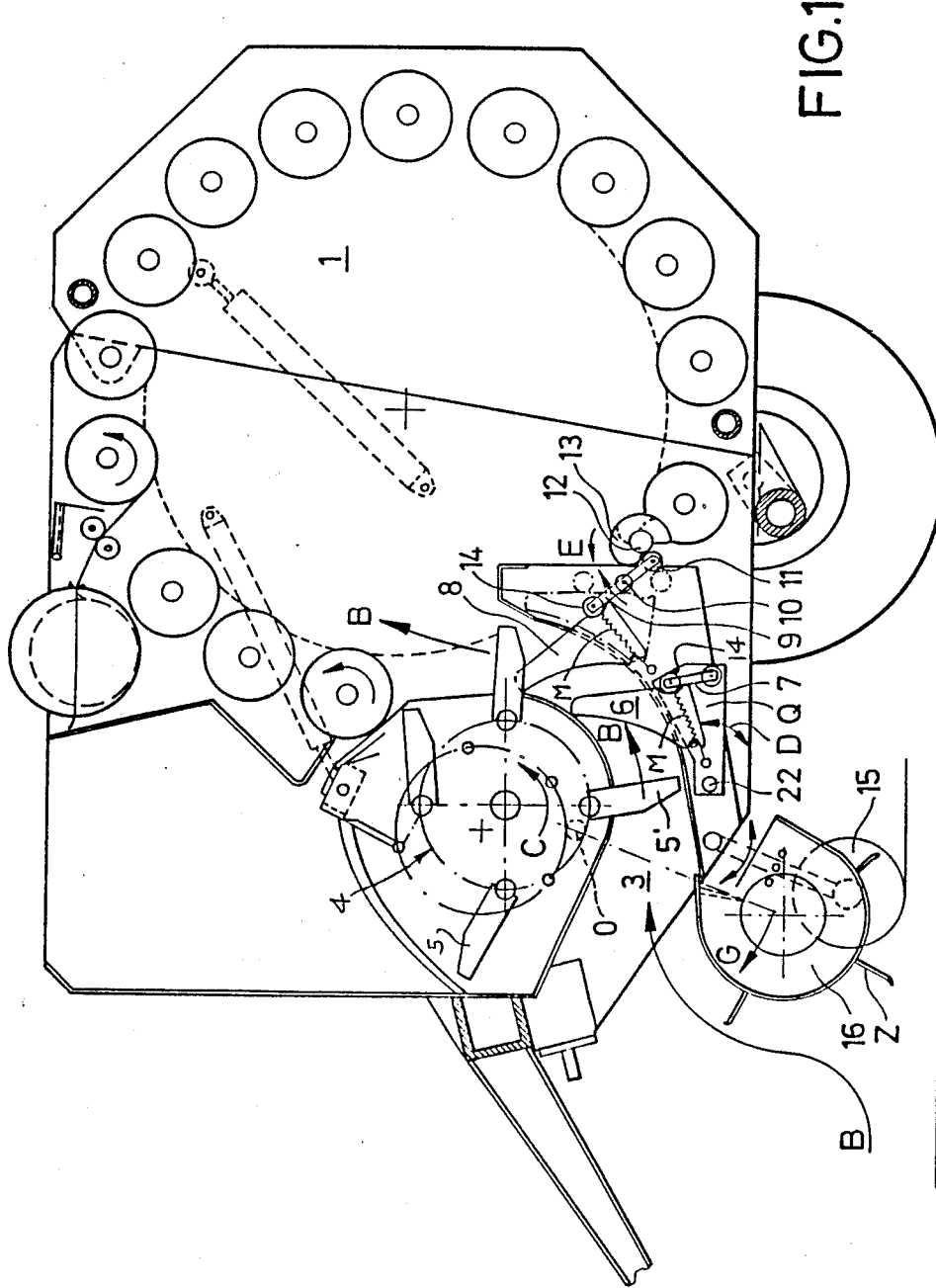
FIG. 1 shows a diagrammatic side view of a round baler with a cutting device.

FIG. 1 diagrammatically shows a section through a round baler which is for instance towed by a tractor. As is usual, the round baler comprises a tying device (not shown in greater detail) for the completed bale which is formed in the pressing chamber 1 by a plurality of press rollers which surround said bale and are disposed along the outer wall. After the bale has been completed and tied up, the rear half of the pressing chamber is lifted by a hydraulic cylinder and the bale is thereby ejected.

To form the bale, the mown stalk crops are conveyed by the pick-up device 16 in the direction of arrows B through a feed channel 3 into the interior of the pressing chamber 1. The pick-up device can for instance be pivoted about point 0 in the direction of arrow G via hydraulic cylinders H shown in FIG. 3 and disposed at the left and right. An adjustable sensing wheel by which the distance of the prongs Z is fixed with respect to the ground is designated by 15.

The feed channel 3 has provided therein a feed device 4 which may for instance be a rake chain conveyor or a drum conveyor with a plurality of feed prongs 5, 5' which engage into the feed channel during their motion and serve to transport the harvest products in the direction shown by arrow B. The harvest products pick up by the pick-up device 16 and supplied to the feed channel 3 are proportioned by the feed prongs 5, 5' in equal portions and supplied into the pressing chamber 1 in a uniform flow. The rotational direction of the feed device 4 is here outlined by arrow C.

At least one row which is arranged in a direction transverse to the feed channel and consists of pivotably supported knives for cutting the stalk crops projects into the feed channel 3. Knife rows are provided in the embodiment shown in FIG. 1, with a knife 6 belonging to the lower row and a knife 8 belonging to the upper row being each arranged with a pivot 17' and 17 respectively (FIG. 2) on cross arms in such a way that they can be passed by the double-armed feed prongs 5, 5'.

In another embodiment (not shown) there is only provided one knife row, for instance 6, which does not comprise a triggering shaft for varying the cutting length, but is connected to a suitable pivoting device to be thus pivotable out of the feed channel as a whole during the winding operation itself.

In both embodiments, i.e. with the single knife row and the double knife row including the triggering shaft for varying the cutting length, the pressing chamber may have provided therein a sensor for sensing the internal pressure of the round bale which is being wound, and/or a measuring device for measuring the diameter of the bale so as to pivot either the one knife row or the two knife rows out of the feed channel at a suitable moment so that the outermost surface layer of the almost completed round bale is wound from uncut stalk crops. This last surface layer or the two last surface layers of uncut material protect the baler better than do cut stalk crops, with the cut interior part ensuring here that the bale can be opened up.

Figure 2:
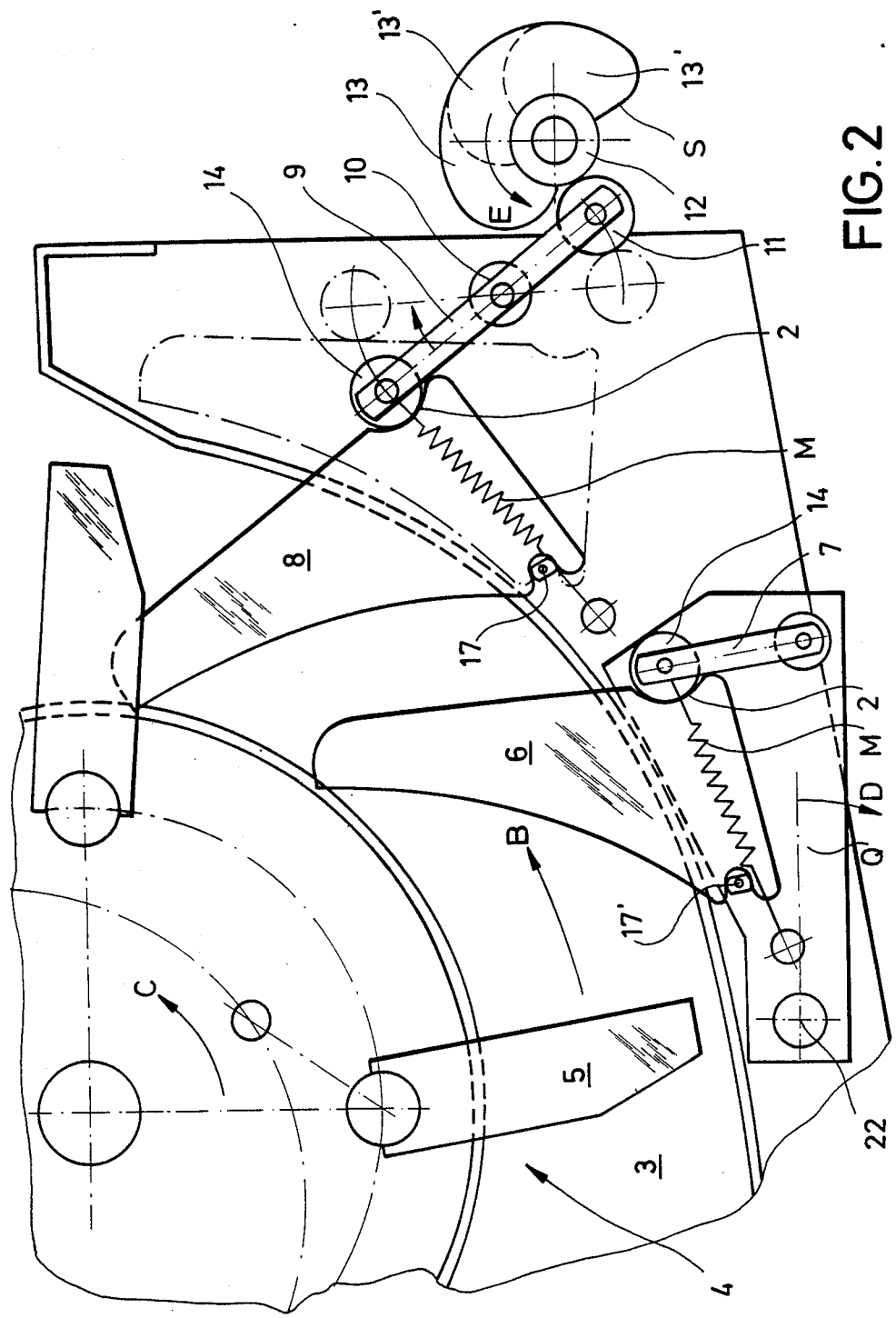
FIG. 2 shows an enlarged view of the cutting device.

In FIG. 2 numeral 7 designates a knife lever for a plurality of lower knives 6 which are arranged next to each other in a row; as usual, the knife lever 7 carries at its upper end a knife roll 14 which together with suitable springs M constitutes a known overload protection device and return means for the knives. Each knife 6 is here provided with a knife lever 7 of its own, the lower knives 6 being in the conventional way pivotable out of the feed channel 3 as a whole about the pivot 22 of a cross arm Q on which the knives 6 are pivotably supported via the pivots 17' so that the cutting width is doubled in the channel.

Numeral 9 designates knife levers for the upper knives 8, each knife thereof being also provided with a knife lever of its own. At their upper ends the knife levers 9 carry a spring-loaded knife roll 14 which locks into a recess 2 on the back of the knife 8. Hence, the known overload protection device and the return means are here also ensured for each knife 8 of the upper row so that these knives pivot rearwards upon impact of a foreign body and, after said foreign body has passed by, are pivoted again into their operative position by the springs M. The knife levers 9 for the upper knives 8 are now hingedly supported at their center on a pivot 10 about which they can be pivoted by the action of a triggering shaft 12 supported behind the knife row.

For each knife the triggering shaft 12 carries a curved cam member 13, 13', 13" which may be of different design. The curved cam members are here offset relative to each other (e.g. 90° or 60°) in such a way that the next knife group is only swung out after the preceding swinging movement has almost or entirely been completed. The effective outer contour of the curved cam member which acts on the triggering roll 11 of the knife lever 9 comprises a lifting cam section, for instance a circular arc or a spiral, as well as a centric part and a possibly straight lowering cam section S.

A specific number of knifes 8 or a knife group can be pivoted out of the feed channel 3 back into an inoperative position (dash-dotted illustration), e.g. each second knife, which results in the doubling of the cutting width, by suitably rotating the triggering shaft 12 in the direction of arrow E and by the action of the curved cam members 13, which are offset relative to each other, on a number of knife levers 9. In the shown embodiment one third of the knife levers 9 are pivoted to the right by rotating the triggering shaft 12 and the curved cam members 13, respectively, and the spring/loaded rolls 14 are thereby also lifted from the back of the knife. As a result of their weight and the position of their center of gravity the knives thus pivot about their pivot axis 17 into the dash-dotted position, their lowermost pivotal position being defined by the end position of the rolls 14. When the triggering shaft 12 is further rotated by one step, the curved cam members 13' act, for instance, on each second one of the remaining knives so that these knives are also swung out and the cutting width is again doubled. A further rotation of the triggering shaft 12 by one step has the effect that all knives are now swung out of the feed channel 3 by the rotation of the curved cam members 13, 13', 13" so that the harvest products pass through the feed channel in their uncut state and are conveyed into the interior of the round baler. If a knife does not swing out by virtue of its own weight because it got slightly stuck, the swinging movement is automatically carried out during loading by the loading pressure of the stalk crops.

There are several possibilities of actuating the triggering shaft 12. Direct manual rotation of the triggering shaft 12 is not possible because of the high torque and the many knife springs M to be tensioned. By contrast, an indirect manual operation with a transmission gear, for instance by means of a spur gear or worm gear, is possible, for which purpose, however, a great effort is still required.

An indirect manual operation via a threaded drawbar or push bar with a manually operated wheel is also possible; in this case, however, the curved cam members must have a relatively steep lifting cam section.

Furthermore, it is possible to actuate the triggering shaft 12 directly by means of a hydraulic system; instead of the threaded drawbar a pressure cylinder with a special hydraulic connection is required in this case. It is especially advantageous when the rotating means for the triggering shaft 12 consists of a step drive with a ratchet mechanism and a ratchet wheel (FIGS. 3 and 4), and when the drive is operated via a drawbar 18 by the existing hydraulic lifting device for the pick-up device 16. An additional hydraulic cylinder with a connection and valve of its own is here not required. In the shown embodiment the cutting width is adjusted each time the pick-up device 16 has been lifted and lowered once. The lifting and lowering number of the pick-up device for achieving an adjustment of the cutting width depends on the arrangement of the curved cam member. Another arrangement can also be chosen; this requires several lifting and lowering operations and the swinging of the subsequent knives can here be adapted and improved.

Figure 3:
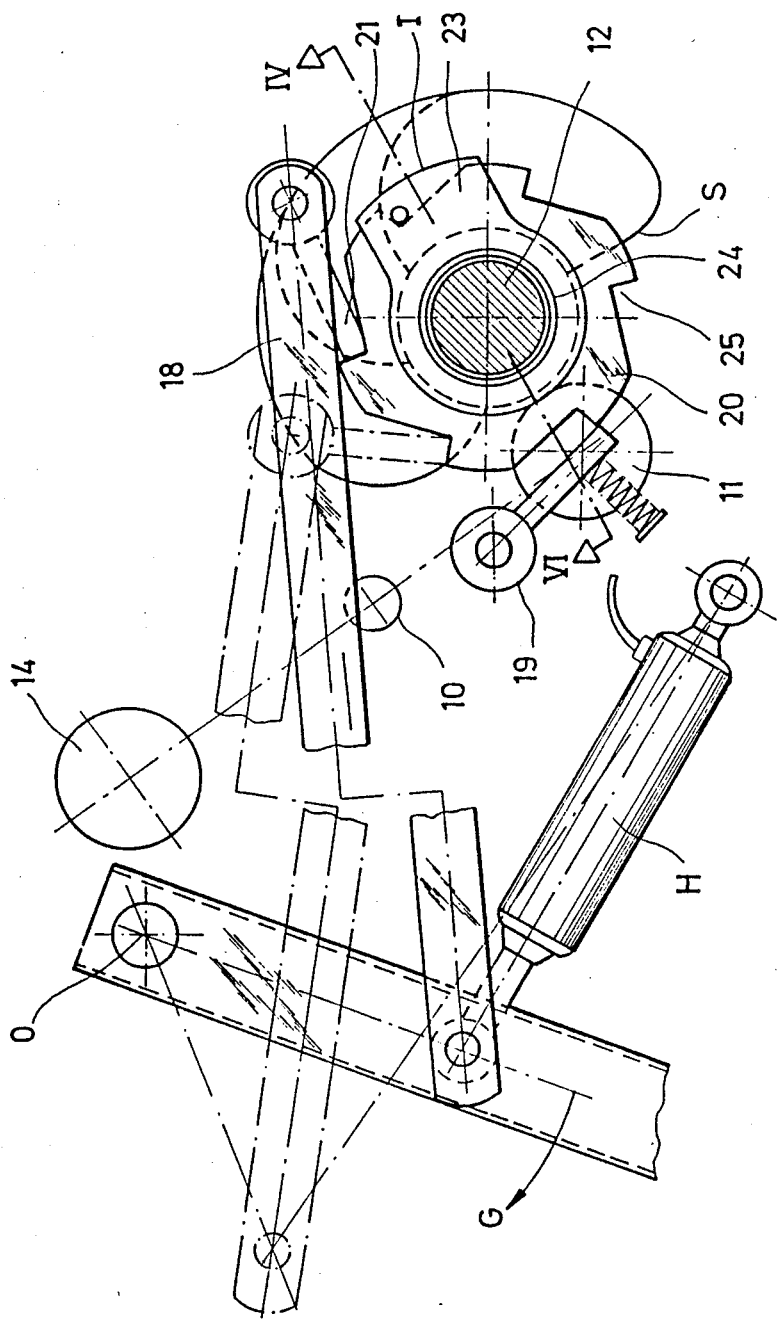
FIG. 3 shows an enlarged side view of a rotating means for the triggering shaft.
Figure 4:
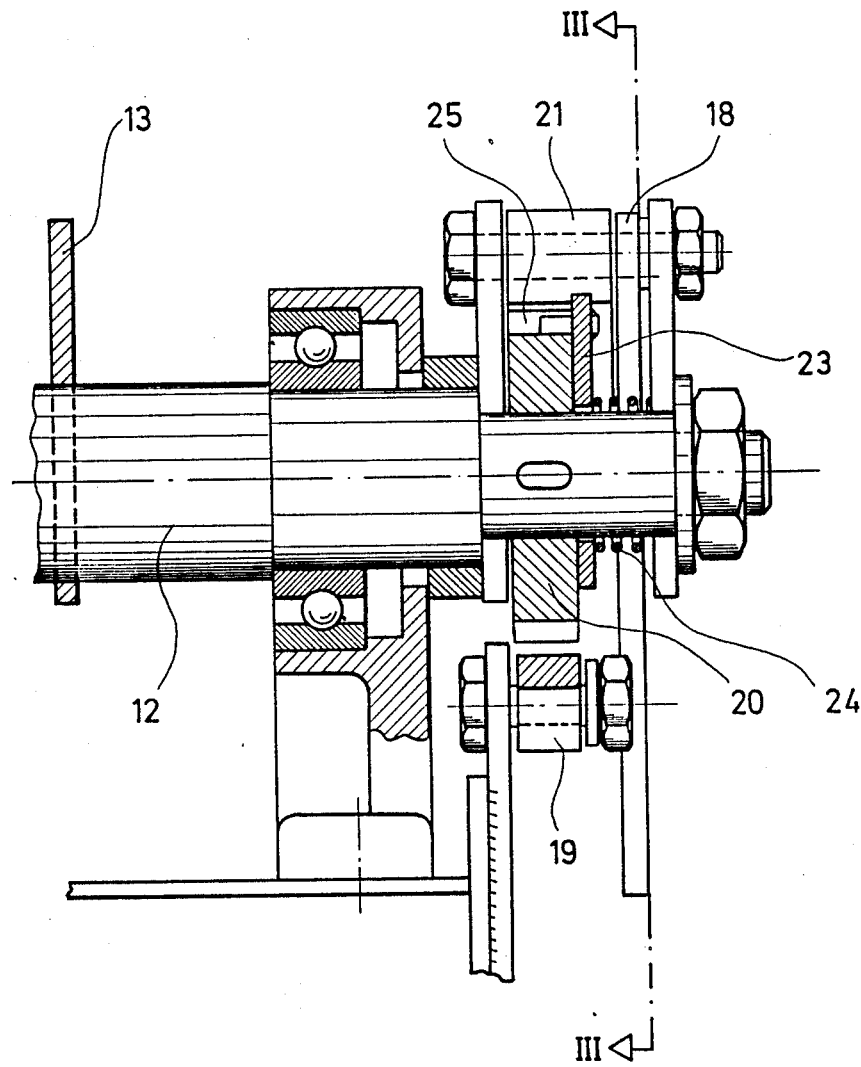
FIG. 4 shows a sectional view IV—IV of FIG. 3.

FIG. 3 diagrammatically shows a side view of such a rotating means. The triggering shaft which is provided with a ratchet wheel 20 is again designated by numeral 12. An adjusting segment 23 which is pressed via a pressure spring 24 against the ratchet wheel and locked at the preselected tooth gap 25 (FIG. 4) is arranged next to the ratchet wheel 20 to adjust and preselect the desired cutting lenght. A short arc I covers this tooth gap such that the advance pawl 21 cannot lock and that the cutting length adjusted in this way is maintained. An actuation of the drawbar 18 which is connected to pick-up devices rotates the triggering shaft via the pawl 21 by one step so that the curved cam members 13 act on the triggering rolls 11 of a number of knives 8 and swing them out.

The adjusting segment 23 may advantageously be provided with a preselection scale (not shown) from which it can be seen how far the adjusting segment has to be rotated to obtain a desired cutting length. The adjusting segment 23 can also be brought into such a position that all knives remain in engagement and that the upward and downward swinging of the pick-up device which is required during operation does not rotate the triggering shaft. The adjusting segment 23 is here adjusted such that the pawl 21 does not come into engagement with the ratchet wheel 20.

When the triggering shaft 12 is rotated, the knife levers 9 are rotated by the springs M to the right in a direction opposite to the direction of their actuation, i.e. the triggering rolls 11 apply a force of pressure to the curved cam disc 13 in a direction opposite to the rotational direction of the triggering shaft 12. To prevent a backward rotation of the triggering shaft 12 due to said force of pressure during the returning of the pawl 21, it is necessary to assign an additional retention ratchet 19 to the ratchet wheel 20. The retention ratchet is here in communication with a spring element which always holds it in abutment with the ratchet wheel.

After all knives have been swung out, all knives 8 can be fully swung into the feed channel 3 by further rotating the triggering shaft 12; said knives, however, would suddenly move forward into the cutting position by the action of the biasing springs M connected to the knife rolls. To prevent this, a braking device (not shown) is arranged on the triggering shaft 12; said device becomes operative in this last rotational angle area, whereby the movement of the knives 8 darting into the feed channel 3 is slowed down.

Hence, the present invention provides a round baler comprising a cutting device which allows the adjustment of the cutting length to preselected values by swinging individual or all knives of one or several knife groups out of the operative position into an inoperative position by simply lifting or lowering the pick-up device. The protection against foreign matter by swinging the individual knives over the whole width of the feed channel upon impact of an obstacle and automatic return after said obstacle has passed by make it possibe to maitain the set cutting width.

I claim:

1. A round baler for cut stalk crops comprising a hinge-type pressing chamber including an inlet opening for said stalk crops and a tying arrangement for the completed bale, a pick-up device for said stalk crops, a feed drum which is disposed between said pick-up device and said inlet opening and whose length corresponds to the length of the bale to be formed, a cutting device provided in a feed channel, wherein said cutting device includes a plurality of pivotally-supported knives which in their cutting position project into said feed channel and are arranged in at least one row, and which are held in their cutting position by means of spring-loaded knife levers and adapted to be pivoted against the spring load up to a position in which they have no cutting effect on said stalk crops, and wherein a sensor for sensing the internal pressure of said round bale is provided, said sensor controlling a pivoting device for said cutting device for pivoting said knives out of said feed channel when a predetermined value of said pressure is sensed.

2. A round baler for cut stalk crops comprising a hinge-type pressing chamber including an inlet opening for said stalk crops and a tying arrangement for the completed bale, a pick-up device for said stalk crops, a feed drum which is disposed between said pick-up device and said inlet opening and whose length corresponds to the length of the bale to be formed, a cutting device provided in a feed channel, wherein said cutting device includes a plurality of pivotally-supported knives which in their cutting position project into said feed channel and are arranged in at least one row, and which are held in their cutting position by means of spring-loaded knife levers and adapted to be pivoted against the spring load up to a position in which they have no cutting effect on said stalk crops, and wherein a measuring device for measuring the diameter of said round bale is provided, said measuring device controlling a pivoting device for said cutting device, for pivoting said knives out of said feed channel when a predetermined value of said diameter is sensed.

3. The round baler according to claims 1 or 2 characterized in that said knife levers of at least one knife row are rotatably supported at about their center on a fixed pin and that said knife row has associated therewith a triggering shaft which is provided with a number of curved cam members directly associated with said knife levers, said number corresponding to the number of said knives and said curved cam members being offset relative to each other with resect to the circumference of said triggering shaft.

4. The round baler according to claims 1 or 2, characterized in that each of said curved cam members comprises a lifting cam section, a centric part and a lowering cam section.

5. The round baler according to claims 1 or 2, characterized in that said triggering shaft is connected to a rotating means.

6. The round baler according to claim 5, characterized in that said rotating means for said triggering shaft comprises a spur gear or a worm gear.

7. The round baler according to claim 5, characterized in that said rotating means for said triggering shaft comprises a threaded drawbar or push bar with a manually actuable ratchet.

8. A round baler according to claim 5, characterized in that said rotating means comprises a threaded drawbar or push bar with a pressure cylinder.

9. The round baler according to claim 5, characterized in that said rotating means comprises a step drive with a ratchet mechanism and a ratchet wheel which are connected via a drawbar to said pick-up device which is adapted to be pivoted through hydraulic cylinders and intended for said stalk crops.

10. The round baler according to claim 9, charaterized in that said ratchet wheel has associated therewith a rotatable adjusting segment which by the force of a spring is adjacent to said ratchet wheel and adapted to be locked therein, said adjusting segment comprising a portion which has at least the width of a tooth gap of said ratchet wheel, and projecting in the area of said portion over the outer edge of said ratchet wheel for being engaged by an advance pawl.

11. The round baler according to claim 10, characterized in that said knife row consists of a plurality of knife groups and that the curved cam members of each of said knife groups are offset relative to each other in such a way that the next knife group is only swung out into an inoperative position after the preceding group has been swung out.

12. A method of forming a round bale using a round baler comprising a hinge-type pressing chamber including an inlet opening for said stalk crops and a tying arrangement for the completed bale, a pick-up device for said stalk crops, a feed drum which is disposed between said pick-up device and said inlet opening and whose length corresponds to the length of the bale to be formed, a cutting device provided in a feed channel and including a plurality of pivotally-supported knives which in their cutting position project into said feed channel and are arranged in at least one row, and which are held in their cutting position by means of spring-loaded knife levers and adapted to be pivoted against the spring load up to a position in which they have no cutting effect on said stalk crops, comprising the steps of winding said round bale from cut stalk crops, measuring during the winding operation the diameter of said round bale and/or the internal pressure of said round bale, and pivoting said cutting device out of said feed channel as a whole as soon as a predetermined threshold value of said diameter and/or of said pressure has been reached so that at least the outermost surface layer of said round bale is wound from uncut stalk corps.

* * * * *